United States Patent [19]
Falla et al.

[11] Patent Number: 5,721,025
[45] Date of Patent: Feb. 24, 1998

[54] POUCHES FOR PACKAGING FLOWABLE MATERIALS IN POUCHES

[75] Inventors: Daniel James Falla, Sarnia, Canada; Jose V. Saavedra, Lake Jackson, Tex.

[73] Assignee: The Dow Chemical Company, Midland, Mich.

[21] Appl. No.: 567,608

[22] Filed: Dec. 5, 1995

[51] Int. Cl.$^6$ ................................................. B32B 31/20
[52] U.S. Cl. .................. 428/35.2; 428/35.5; 428/192; 428/349; 428/516; 426/127; 426/130; 156/308.4; 156/145; 156/292
[58] Field of Search .................. 428/35.2, 35.5, 428/192, 349, 516; 426/127, 130; 525/222, 240; 156/308.4, 145, 292

[56] References Cited

U.S. PATENT DOCUMENTS

| | | | |
|---|---|---|---|
| 4,503,102 | 3/1985 | Mollison | 428/35.5 |
| 4,521,437 | 6/1985 | Storms | 428/516 |
| 5,288,531 | 2/1994 | Falla et al. | 428/35.2 |
| 5,360,648 | 11/1994 | Falla et al. | 428/35.2 |
| 5,364,486 | 11/1994 | Falla et al. | 156/308.4 |

FOREIGN PATENT DOCUMENTS

| | | |
|---|---|---|
| 0 057 238 | 8/1982 | European Pat. Off. . |
| 93/03093 | 2/1993 | WIPO . |
| 94/06857 | 3/1994 | WIPO . |

*Primary Examiner*—Charles Nold
*Attorney, Agent, or Firm*—Tai-Sam Choo

[57] ABSTRACT

An environmentally friendly polymer film pouch made from a polyethylene film structure for the packaging of flowable materials, for example, milk. The film may be a monolayer or multilayer structure, such as two-layer or a three-layer coextruded film containing at least one layer of a blend of an ultra low density polyethylene and a high pressure low density polyethylene as a seal layer having high melt strength. Also disclosed is a process for making the pouch for packaging flowable materials using a film structure described hereinabove.

28 Claims, 3 Drawing Sheets

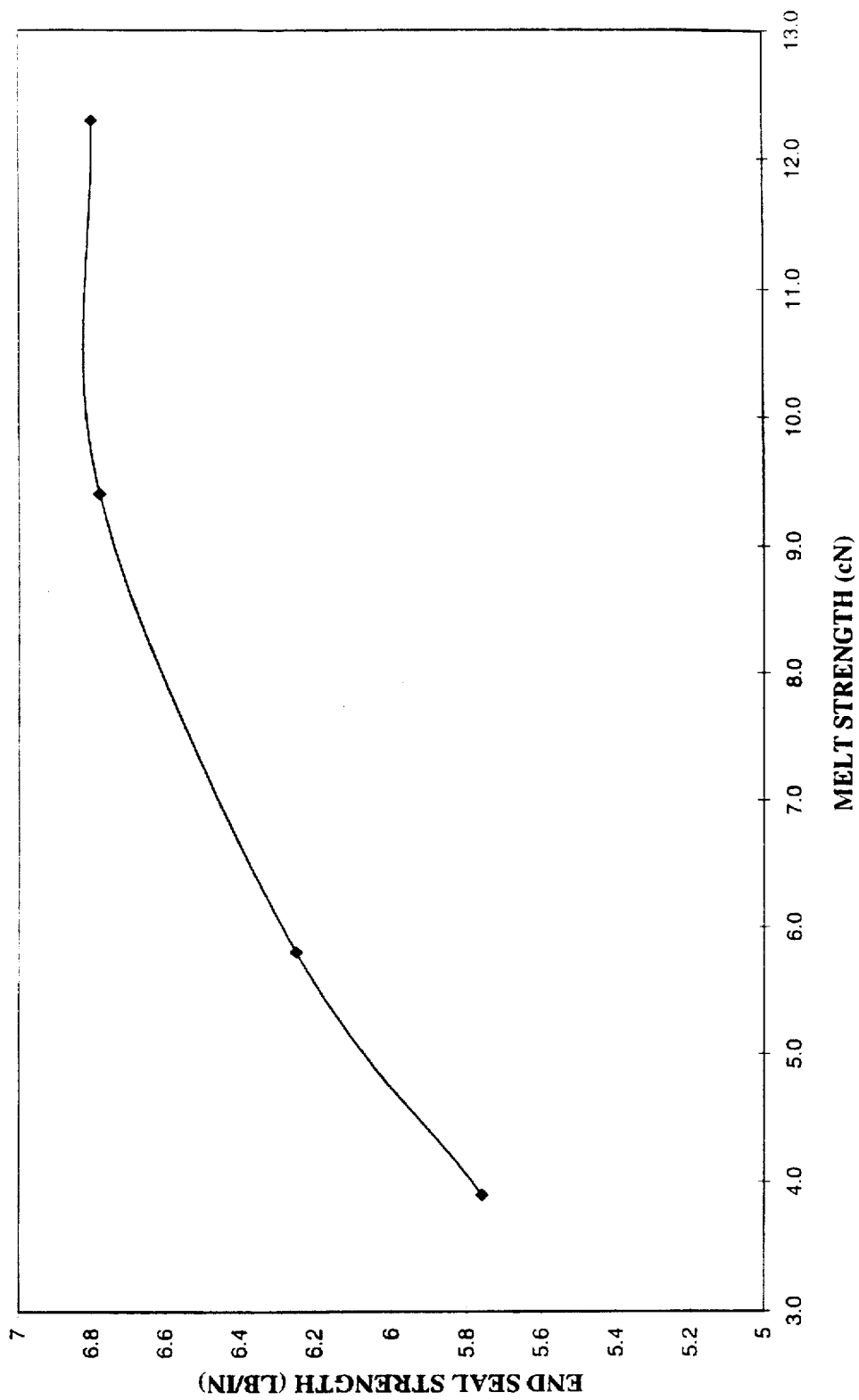

POUCHES FOR PACKAGING FLOWABLE MATERIALS IN POUCHES

BACKGROUND OF THE INVENTION

This invention relates to a pouch used in consumer packaging made from certain film structures useful for packaging flowable materials, for example liquids such as milk.

U.S. Pat. Nos. 4,503,102, 4,521,437 and 5,288,531 disclose the preparation of a polyethylene film for use in the manufacture of a disposable pouch for packaging of liquids such as milk. U.S. Pat. No. 4,503,102 discloses pouches made from a blend of a linear ethylene copolymer copolymerized from ethylene and an alpha-olefin at the $C_4$ to $C_{10}$ range and a ethylene-vinyl acetate polymer copolymerized from ethylene and vinyl acetate. The linear polyethylene copolymer has a density of from 0.916 to 0.930 g/cm3 and a melt index of from 0.3 to 2.0 g/10 minutes. The ethylene-vinyl acetate polymer has a weight ratio of ethylene to vinyl acetate from 2.2:1 to 24:1 and a melt index of from 0.2 to 10 g/10 minutes. The blend disclosed in U.S. Pat. No. 4,503,102 has a weight ratio of linear low density polyethylene to ethylene-vinyl acetate polymer of from 1.2:1 to 4:1 U.S. Pat. No. 4,503,102 also discloses laminates having as a sealant film the aforementioned blend.

U.S. Pat. No. 4,521,437 describes pouches made from a sealant film which is from 50 to 100 parts of a linear copolymer of ethylene and octene-1 having a density of from 0.916 to 0.930 g/cm3 and a melt index of 0.3 to 2.0 g/10 minutes and from 0 to 50 parts by weight of at least one polymer selected from the group consisting of a linear copolymer of ethylene and a $C_4$–$C_{10}$-alpha-olefin having a density of from 0.916 to 0.930 g/cm3 and a melt index of from 0.3 to 2.0 g/10 minutes, a high-pressure polyethylene having a density of from 0.916 to 0.924 g/cm3 and a melt index of from 1 to 10 g/10 minutes and blends thereof. The sealant film disclosed in the U.S. Pat. No. 4,521,437 is selected on the basis of providing (a) pouches with a M-test value substantially smaller, at the same film thickness, than that obtained for pouches made with film of a blend of 85 parts of a linear ethylene/butene-1 copolymer having a density of about 0.919 g/cm3 and a melt index of about 0.75 g/10 minutes and 15 parts of a high pressure polyethylene having a density of about 0.918 g/cm3 and a melt index of 8.5 g/10 minutes, or (b) an M(2)-test value of less than about 12%, for pouches having a volume of from greater than 1.3 to 5 liters, or (c) an M(1.3)-test value of less than about 5% for pouches having a volume of from 0.1 to 1.3 liters. The M, M(2) and M(1.3)-tests are defined pouch drop tests in U.S. Pat. No. 4,521,437. The pouches may also be made from composite films in which the sealant film forms at least the inner layer.

U.S. Pat. No. 5,288,531 discloses pouches made from a film structure having a blend of (a) from 10 to 100 percent by weight of at least one polymeric seal layer of an ultra low density linear ethylene copolymer interpolymerized from ethylene and at least one alpha-olefin in the range of $C_3$–$C_{10}$ with a density of from about 0.89 g/cm3 to less than 0.915 g/cm3 and (b) from 0 to 90 percent by weight of at least one polymer selected from the group consisting of a linear copolymer of ethylene and a $C_3$–$C_{18}$-alpha-olefin having a density of greater than 0.916 g/cm3 and a melt index of from 0.1 to 10 g/10 minutes, a high-pressure low density polyethylene having a density of from 0.916 to 0.930 g/cm3 and a melt index of from 0.1 to 10 g/10 minutes, or ethylene-vinyl acetate copolymer having a weight ratio of ethylene to vinyl acetate from 2.2:1 to 24:1 and a melt index of from 0.2 to 10 g/10 minutes. The heat seal layer in the U.S. Pat. No. 5,288,531 provides improved hot tack strength and lower heat seal initiation temperature to a two-layer or three-layer coextruded multilayer film structure described therein.

The polyethylene pouches known in the prior art have some deficiencies. The problems associated with pouches known in the prior art relate to the sealing properties and performance properties of the film used for preparing pouches. In particular, prior art films made into pouches in general have a high incident of "leakers", i.e., seal defects such as pinholes which develop at or near the seal in which flowable material, for example, milk escapes from the pouch. Although the seal and performance properties of the prior art films have been generally satisfactory in regard to other desired properties, there is still a need in the industry for better seal and performance properties in films for manufacture of hermetically sealed pouches containing flowable materials. More particularly, there is a need for improved sealing properties of the film such as hot tack and forimproved melt strength in order to improve the processability of the film and to improve pouches made from the films.

For example, the line speed of known packaging equipment used for manufacturing pouches such as form, fill and seal machines, is often limited by the sealing properties of the ordinary polyethylene films due, ostensibly, to their relatively low melt strength. Therefore, the speed at which a form, fill and seal machine can produce a pouch from ordinary polyethylene films is limited and, thus, the number of pouches produced per unit time is also limited. Many have attempted to improve sealing properties of the polymeric composition used in pouch film without success.

It is desired to provide a polyethylene film structure for a pouch container having improved melt strength with performance properties as good or better than the known prior art pouch films.

It is also desired to provide a film structure for a pouch container which can be processed through a form, fill and seal machine as a monolayer or multilayer film.

It is further desired to provide a pouch made from the aforementioned film structures such that the pouch has a reduced failure rate.

SUMMARY OF THE INVENTION

It has been discovered that as the melt strength of the film is increased, the amount of film thinning that occurs in the seal area is reduced, and, as such, the speed of a form, fill and seal machine can be increased and, thus, the number of pouches produced per unit time can be increased.

One aspect of the present invention provides a pouch containing a flowable material, said pouch being made from a film structure with at least one seal layer of a polymeric composition comprising: (A) from 10 to 100 percent, based on the total weight of said composition, of a mixture of (1) from 5 to 95 percent by weight, based on 100 weight parts of said mixture, of at least one ultra low density polyethylene being a linear ethylene copolymer interpolymerized from ethylene and at least one α-olefin in the range of $C_3$–$C_{18}$ and having: (a) a density from 0.89 g/cc to less than 0.916 g/cc (b) a melt index ($I_2$) of less than 10 g/10 minutes (c) a melt flow ratio, $I_{10}/I_2$, greater than 5 (d) a molecular weight distribution, Mw/Mn ratio, of greater than about 3 (e) a peak melting point greater than 100° C. as measured by a differential scanning calorimeter; and (2) from 5 to 95 percent by weight, based on 100 weight parts of said mixture, of high pressure low density polyethylene (a) a density from 0.916 g/cc to 0.93 g/cc,(b) a melt index (I2) of less than 1 g/10 minutes and (c) a melt strength greater than 10 cN as determined using a Gottfert Rheotens unit at 190° C.; and (B) from 0 to 90 percent, based on the total weight of said composition, at least one polymer selected from the group consisting of a linear low density polyethylene, a high pressure low density polyethylene, and an ethylene-vinyl acetate copolymer.

One embodiment of the present invention is a pouch made from a two-layer coextruded film containing an outer layer of linear low density polyethylene, ultra low density polyethylene, high pressure low density polyethylene, ethylene-vinyl acetate copolymer or mixtures thereof and an inner seal layer of the aforementioned polymeric composition.

Another aspect of the present invention is a process for preparing the aforementioned pouch.

Yet another embodiment of the present invention is a pouch made from a three-layer coextruded film containing an outer layer and a core layer of ultra low density polyethylene, linear low density polyethylene, high pressure low density polyethylene, ethylene-vinyl acetate copolymer, or a mixture thereof and an inner seal layer of the aforementioned polymeric composition.

It has been discovered that the film structures for the pouches of the present invention have an improved melt strength and correspondingly improved heat seal strength, particularly the end-seal strength. Use of the films for making pouches of the present invention in form, fill and seal machines leads to machine speeds higher than currently obtainable with the use of commercially available film.

BRIEF DESCRIPTION OF THE DRAWINGS

FIG. 6 is a graphical illustration of end-seal strength of 2 liter-milk-filled pouches versus melt strength of ATTANE™ 4203 (ultra low density polyethylene supplied by The Dow Chemical Company) blends with high pressure low density polyethylene.

DETAILED DESCRIPTION OF THE INVENTION

Figure 1:
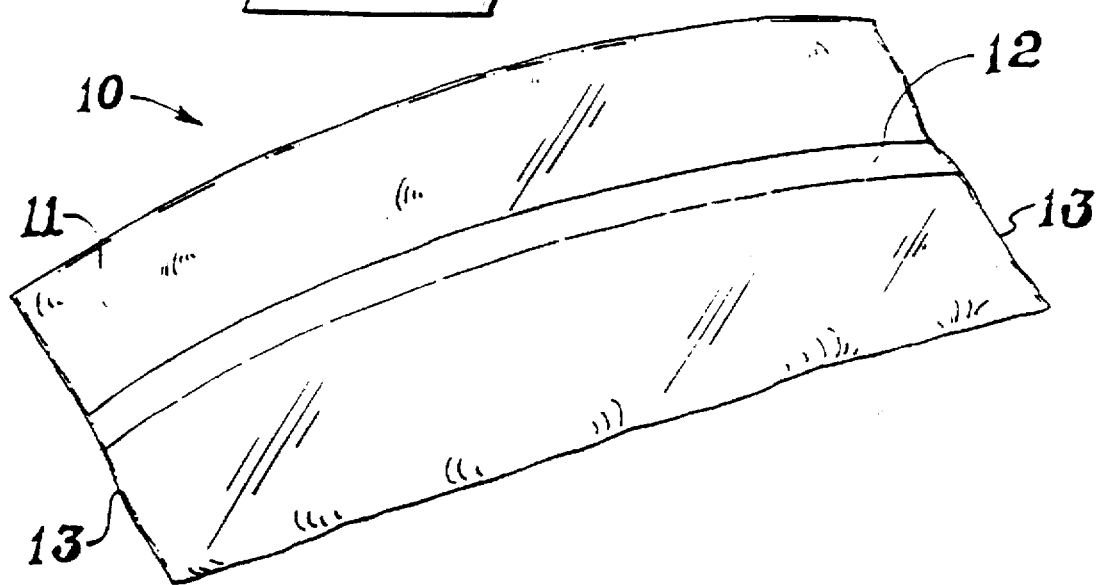
FIG. 1 shows a perspective view of a pouch package of the present invention.
Figure 2:
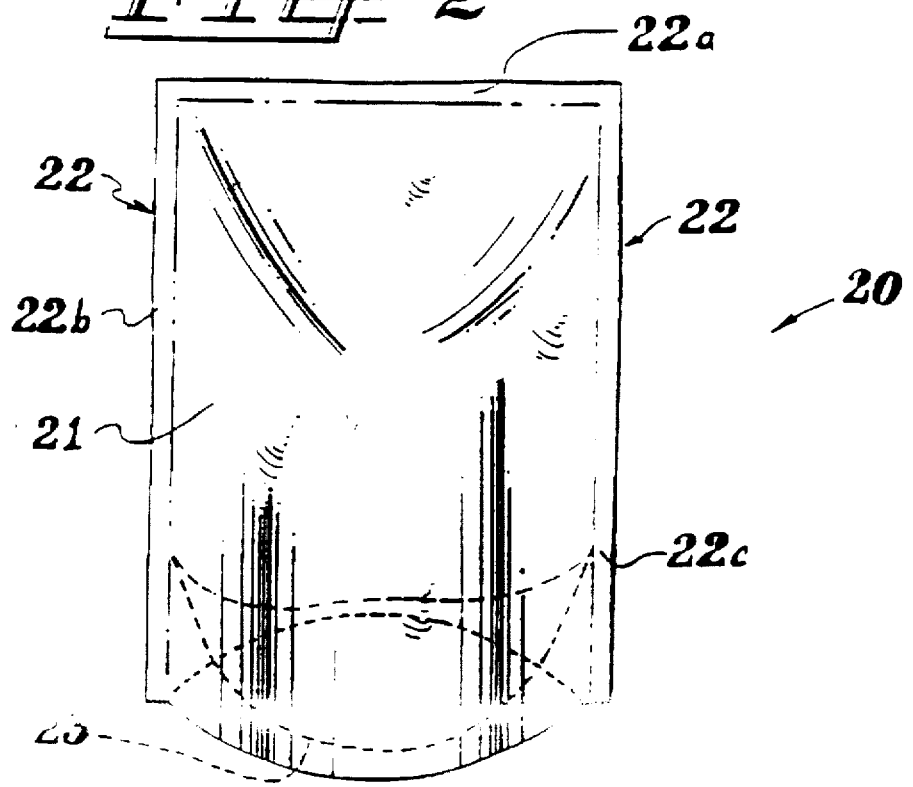
FIG. 2 shows a perspective view of another pouch package of the present invention.

The pouch of the present invention, for example as shown in FIGS. 1 and 2, for packaging flowable materials is manufactured from a three-layer coextruded film structure having a polymeric seal layer comprised of a blend of a ultra low density polyethylene and a high pressure low density polyethylene having a high melt strength. The blend can also contain an ethylene vinyl-acetate copolymer, linear low density polyethylene, homogeneously branched substantially linear ethylene/α-olefin interpolymer, homogeneously branched linear ethylene polymer, high pressure low density polyethylene or blends thereof.

"Melt strength" which is also referred to in the relevant art as "melt tension" is defined and quantified herein to mean the stress or force (as applied by a wind-up drum equipped with a strain cell) required to draw a molten extrudate at some specified rate above its melting point as it passes through the die of a standard plastometer such as the one described in ASTM D1238-E. Melt strength values, which are reported herein in centi-Newtons (cN), are determined using a Gottfert Rheotens at 190° C. In general, for ethylene α-olefin interpolymers and high pressure ethylene polymers, melt strength tends to increase with increased molecular weight, or with broadening of the molecular weight distribution and/or with increased melt flow ratios. The melt strength of the high pressure low density polyethylene of the present invention is greater than 10 cN as determined using a Gottfert Rheotens unit at 190° C., preferably from about 13 to 40 cN, and most preferably 15 to 25 cN. Further, the melt strength of the polymeric composition of the present invention is greater than 5 cN as determined using Gottfert Rheotens unit at 190° C., preferably from about 15 to 70 cN, and most preferably 15 to 50 cN.

Another feature of the present invention is that the ultra low density polyethylene and linear low density polyethylene have a "peak melting point" greater than 100° C. The peak melting point is determined using differential scanning calorimeter (DSC). A full description of the test method is found in *Thermal Characterization Of Polymeric Materials*, E. A. Turi, (New York: Academic Press, 1981), p. 46 to 59, which is incorporated in its entirety by reference.

One component of the polymer composition of the present invention is a heterogeneously branched ultra or very low density polyethylene (ULDPE or VLDPE). Heterogeneously branched ULDPE is well known among practitioners of the linear polyethylene art. They are prepared by the continuous, batch or semi-batch solution, slurry, or gas phase polymerization of ethylene and one or more optional α-olefin comonomers using conventional Ziegler-Natta polymerization processes and coordination metal catalysts as described, for example, by Anderson et al. in U.S. Pat. No. 4,076,698, the disclosure of which is incorporated herein by reference. These conventional Ziegler-type linear polyethylenes are not homogeneously branched and they do not have any long-chain branching. Also, these polymers do not show any substantial amorphism at lower densities since they inherently posses a substantial high density (crystalline) polymer fraction. At a density less than 0.90 g/cc, these materials are very difficult to prepare using conventional Ziegler-Natta catalysis and are also very difficult to pelletize. At densities less than 0.90 g/cc the pellets are tacky and tend to clump together.

The terms "heterogeneous" and "heterogeneously branched" are used herein in the conventional sense in reference to a linear ethylene interpolymer having a comparatively low short chain branching distribution index. The short chain branching distribution index (SCBDI) is defined as the weight percent of the polymer molecules having a comonomer content within 50 percent of the median total molar comonomer content. The short chain branching distribution index of polyolefins that are crystallizable from solutions can be determined by well-known temperature rising elution fractionation techniques, such as those described by Wild, et al., *Journal of Polymer Science, Poly. Phys. Ed.*, Vol. 20, p. 441 (1982), L. D. Cady, "The Role of Comonomer Type and Distribution in LLDPE Product Performance," SPE Regional Technical Conference, Quaker Square Hilton, Akron, Ohio, October 1-2, pp. 107-119 (1985), or U.S. Pat. No. 4,798,081, the disclosures of all which are incorporated herein by reference.

The terms "ultra low density polyethylene" (ULDPE), "very low density polyethylene" (VLDPE) and "linear very low density polyethylene" (LVLDPE) have been used interchangeable in the polyethylene art to designate the polymer subset of linear low density polyethylene's having a density less than or equal to about 0.916 g/cc. The term "linear low density polyethylene" (LLDPE) is then applied to those linear polyethylene's having a density above 0.916 g/cc. These terms do not, in themselves, indicate whether the polymer is homogeneously branched or heterogeneously branched, but do indicate that the polymer is characterized as having a linear polymer backbone in the conventional sense of the term "linear".

Commercial examples of heterogeneously branched linear interpolymers suitable for use in the present invention include ATTANE ULDPE polymers supplied by The Dow Chemical Company and FLEOXMER VLDPE polymers supplied by Union Carbide Corporation.

The ULDPE is generally a linear copolymer of ethylene and a minor amount of an α-olefin having from 3 to about 18 carbon atoms, preferably from 4 to about 10 carbon atoms and most preferably 8 carbon atoms. The ULDPE for the polymeric composition of the present invention has a density of less than or equal to 0.916 g/cc, more preferably from about 0.916 to about 0.89 g/cc, most preferably from about 0.90 to about 0.916 g/cc; generally has a melt index ($I_2$) of less than 10 g/10 minutes, preferably from about 0.1 to about 10 g/10 minutes, most preferably from about 0.5 to about 2 g/10 minutes and generally has an $I_{10}/I_2$ ratio of from about 0.1 to about 20, preferably from about 5 to about 20, and most preferably 7 to 20.

Suitable α-olefin for the ULDPE and LLDPE of the present invention are represented by the following formula:

$$CH_2=CHR$$

where R is a hydrocarbyl radical having from one to twenty carbon atoms. The interpolymerization process can be a solution, slurry or gas phase technique or combinations thereof. Suitable α-olefin for use as comonomers include 1-propylene, 1-butene, 1-isobutylene, 1-pentene, 1-hexene, 4-methyl-1-pentene, 1-heptene and 1-octene, as well as other monomer types such as styrene, halo- or alkyl-substituted styrenes, tetrafluoro-ethylene, vinyl benzocyclobutane, 1,4-hexadiene, 1,7-octadiene, and cycloalkenes, e.g., cyclopentene, cyclohexene and cyclooctene. Preferably, the α-olefin will be 1-butene, 1-pentene, 4-methyl-1-pentene, 1-hexene, 1-heptene, 1-octene, or mixtures thereof. More preferably, the α-olefin will be 1-hexene, 1-heptene, 1-octene, or mixtures thereof, as coatings, profiles and films fabricated with the resultant extrusion composition will have especially improved abuse properties where such higher α-olefins are utilized as comonomers. However, most preferably, the α-olefin will be 1-octene and the polymerization process will be a continuous solution process.

The molecular weight distribution of the ethylene α-olefin interpolymer compositions and the high pressure ethylene polymer compositions are determined by gel permeation chromatography (GPC) on a Waters 150 high temperature chromatographic unit equipped with differential refractometer and three columns of mixed porosity. The columns are supplied by Polymer Laboratories and are commonly packed with pore sizes of $10^3$, $10^4$, $10^5$ and $10^6$Å. The solvent is 1,2,4-trichlorobenzene, from which 0.3 percent by weight solutions of the samples are prepared for injection. The flow rate is 1.0 milliliters/minute, unit operating temperature is 140° C. and the injection size is 100 microliters.

The molecular weight determination with respect to the polymer backbone is deduced by using narrow molecular weight distribution polystyrene standard (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science*, Polymer Letters, Vol. 6, p. 621, 1968) to derive the following equation:

$$M_{polyethylene}=a*(M_{polystyrene})^b.$$

In this equation, a=0.4316 and b=1.0. Weight average molecular weight, $M_w$, is calculated in the usual manner according to the following formula: $M_w=\Sigma w_i \times M_i$, where $w_i$ and $M_i$ are the weight fraction and molecular weight, respectively, of the $i^{th}$ fraction eluting from the GPC column.

For ULDPE, and LLDPE, the Mw/Mn is about 2 to 7, preferably greater than 3 and especially about 4.

As used herein, the term "interpolymer" includes copolymer, terpolymer and the like. Density is measured in accordance with ASTM D-792. Melt index ($I_2$) is measured according to ASTM D-1238 (condition 190/2.16) less than 10 g/10 min. and a melt flow ratio ($I_{10}/I_2$) greater than 5. $I_{10}$ is measured in accordance with ASTM D-1238 (condition 190/10).

Yet another component of the polymer composition of the present invention is a polyethylene referred to hereinafter as "linear low density polyethylene" ("LLDPE"). An example of a commercially available LLDPE is DOWLEX™ 2045 (Trademark of and commercially available from The Dow Chemical Company). The LLDPE is generally a linear copolymer of ethylene and a minor amount of an α-olefin having from 3 to about 18 carbon atoms, preferably from 4 to about 10 carbon atoms and most preferably 8 carbon atoms. The LLDPE for the polymeric composition of the present invention has a density of greater than or equal to 0.916 g/cc, more preferably from about 0.916 to about 0.940 g/cc, most preferably from about 0.918 to about 0.926 g/cc; generally has a melt index of less than 10 g/10 minutes, preferably from about 0.1 to about 10 g/10 minutes, most preferably from about 0.5 to about 2 g/10 minutes and generally has an $I_{10}/I_2$ ratio of from about 0.1 to about 20, preferably from about 5 to about 20, and most preferably 7 to 20.

The LLDPE can be prepared by the continuous, batch, or semi-batch solution, slurry, or gas phase polymerization of ethylene and one or more optional α-olefin comonomers in the presence of a conventional Ziegler Natta catalyst, such as by the process disclosed in U.S. Pat. No. 4,076,698 to Anderson et al., incorporated herein by reference.

The high pressure low density polyethylene ("LDPE") useful for the polymer compositions and blends of this invention is widely known and readily available. The LDPE has a density of about 0.916 g/cm³ to about 0.930 g/cm³, and a melt index ($I_2$) from about 0.1 g to about 10 g/10 minutes. The LDPE used to form a blend with ultra low density polyethylene for use in the seal layer of this invention has a melt strength of greater than 10 cN, as determined using a Gottfert Rheotens unit at 190° C. A further description of the high pressure low density polyethylene is found in *Modern Plastics Encyclopedia*, Mid-October 1992 Issue, Volume 68, Number 11, pages 61 to 63, the description of which is incorporated in its entirety by reference.

The ethylene-vinyl acetate copolymer ("EVA") useful for polymer compositions and blends of this invention has a weight ratio of ethylene to vinyl acetate from 2.2:1 to 24:1 and a melt index of from about 0.2 g to about 10 g/10 minutes. A further description of EVA is found in *Modern Plastics Encyclopedia*, Mid-October 1992 Issue, Volume 68, Number 11, page 66, the description of which is incorporated by reference in its entirety.

It is believed that the use of LDPE having high melt strength in a film structure for pouches of the present invention (1) provides a pouch that can be fabricated at a fast rate through a form, fill and seal machine, and (2) provides a pouch package having few leakers, particularly when the pouch of the present invention is compared to pouches made with linear low density polyethylene (LLDPE), low density polyethylene (LDPE) or a combination thereof.

Figure 3:
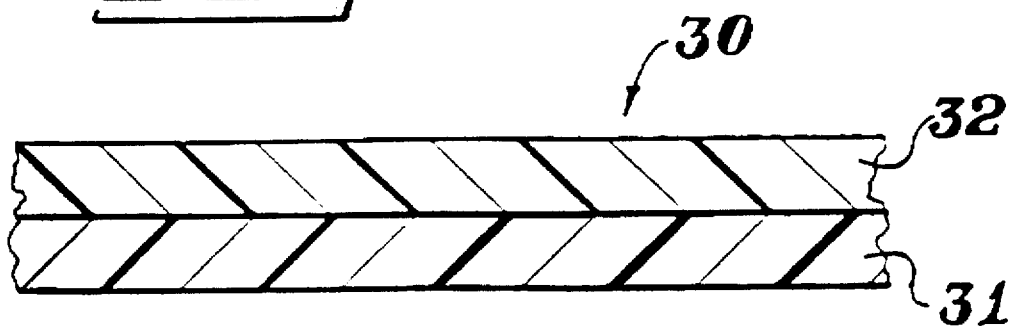
FIG. 3 shows a partial, enlarged cross-sectional view of the film structure of a pouch of the present invention.
Figure 4:
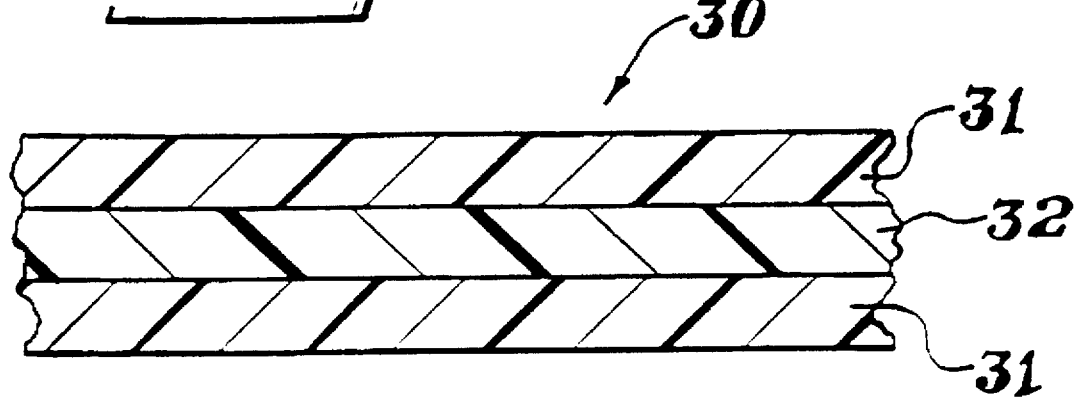
FIG. 4 shows another partial, enlarged cross-sectional view of the film structure of a pouch of the present invention.
Figure 5:
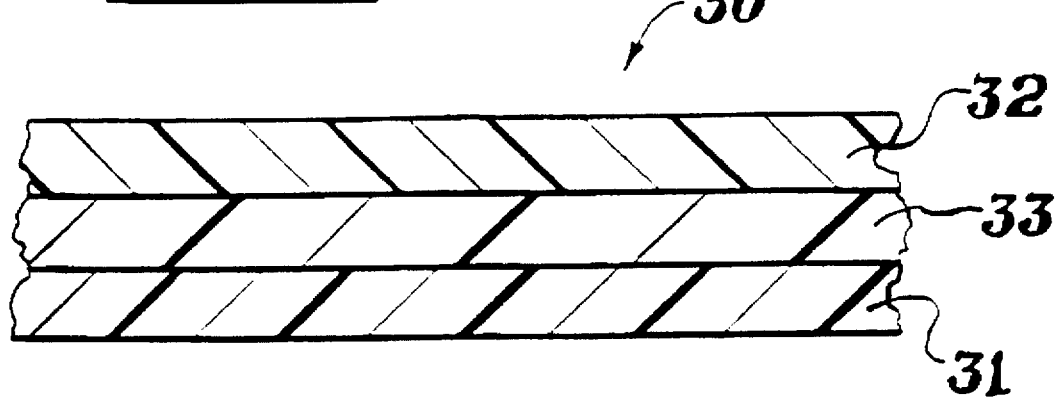
FIG. 5 shows yet another partial, enlarged cross-sectional view of the film structure of a pouch of the present invention.

With reference to FIGS. 3 to 5, the film structure of the pouch of the present invention also includes a multilayer or composite film structure 30, preferably containing the above-described polymer seal layer being the inner layer of the pouch.

As will be understood by those skilled in the art, the multilayer film structure for the pouch of the present invention may contain various combinations of film layers as long as the seal layer forms part of the ultimate film structure. The multilayer film structure for the pouch of the present invention may be a coextruded film, a coated film or a laminated film. The film structure also included the seal layer in combination with a barrier film such as polyester, nylon, EVOH, polyvinylidene dichloride (PVDC) such as SARAN™ (Trademark of The Dow Chemical Company), metallized films and thin metal foils. The end use for the pouch tends to dictate, in a large degree, the selection of the other material or materials used in combination with the seal layer film. The pouches described herein will refer to seal layers used at least on the inside of the pouch.

One embodiment of the film structure 30 for the pouch of the present invention, shown in FIG. 3, comprises seal layer 31 of a blend of ultra low density polyethylene and high melt strength LDPE of this invention and at least one polymeric outer layer 32. The polymeric outer layer 32 is preferably a polyethylene film layer, more preferably a LLDPE. An example of a commercially available LLDPE is DOWLEX™ 2045 (commercially available from The Dow Chemical Company). The thickness of the outer layer 32 may be any thickness so long as the seal layer 31 has a minimum thickness of about 0.1 mil (2.5 microns).

Another embodiment of the film structure 30 for the pouch of the present invention, shown in FIG. 4, comprises the polymeric layer 32 sandwiched between two polymeric seal layers 31.

Still another embodiment of the film structure 30 for the pouch of the present invention, shown in FIG. 5, comprises at least one polymeric core layer 33 between at least one polymeric outer layer 32 and at least one polymeric seal layer 31. The polymeric layer 33 may be the same polymer layer as the outer layer 32 or preferably a different polymer, and more preferably an LLDPE, for example DOWLEX™ 2049 (Trademark of and commercially available from The Dow Chemical Company) that has a higher density than the outer layer 32. The thickness of the core layer 33 may be any thickness so long as the seal layer 31 has a minimum thickness of about 0.1 mil (2.5 microns).

The ultimate film thickness of the final film product used for making the pouch of the present invention is from about 0.5 mil (12.7 microns) to about 10 mils (254 microns), preferably from about 1 mil (25.4 microns) to about 5 mils (127 microns); more preferably from about 2 mils (50.8 microns) to 4 mils (100 microns).

Additives, known to those skilled in the art, such as anti-block agents, slip additives, UV stabilizers, pigments and processing aids may be added to the polymers from which the pouches of the present invention are made.

As can be seen from the different embodiments of the present invention shown in FIGS. 3-5, the film structure for the pouches of the present invention has design flexibility. Different LLDPE polymers can be used in the outer and core layers to optimize specific film properties such as film stiffness. Thus, the film can be optimized for specific applications such as for a vertical form, film and seal machine.

The polyethylene film structure used to make a pouch of the present invention is made by either the blown tube extrusion method or the cast extrusion method, methods well known in the art. The blown tube extrusion method is described, for example, in Modern Plastics Mid-October 1989 Encyclopedia Issue, Volume 66, Number 11, pages 264 to 266. The cast extrusion method is described, for example, in Modern Plastics Mid-October 1989 Encyclopedia Issue, Volume 66, Number 11, pages 256 to 257.

Embodiments of the pouches of the present invention, shown in FIGS. 1 and 2 are hermetically sealed containers filled with "flowable materials". By "flowable materials" it is meant, materials which are flowable under gravity or which may be pumped. The term "flowable materials" does not include gaseous materials. The flowable materials include liquids for example milk, water, fruit juice, oil; bodily fluids, chemical reagents and various liquids used for medical treatments and diagnoses emulsions for example ice cream mix, soft margarine; pastes for example meat pates, peanut butter; preservers for example jams, pie fillings marmalade; jellies; doughs; ground meat for example sausage meat; powders for example gelatin powders, detergents; granular solids for example nuts, sugar; and like materials. The pouch of the present invention is particularly useful for liquid foods for example milk. The flowable material may also include oleaginous liquids for example cooking oil or motor oil.

Once the film structure for the pouch of the present invention is made, the film structure is cut to the desired width for use in conventional pouch-forming machines. The embodiments of the pouch of the present invention shown in FIGS. 1 and 2 are made in so-called form, fill and seal machines well known in the art. With regard to FIG. 1, there is shown a pouch 10 being a tubular member 11 having a longitudinal lap seal 12 and transverse seals 13 such that, a "pillow-shaped" pouch is formed when the pouch is filled with flowable material.

With regard to FIG. 2, there is shown a pouch 20 being a tubular member 21 having a peripheral fin seal 22 along three sides of the tubular member 21, that is, the top seal 22a and the longitudinal side seals 22b and 22c, and having a bottom substantially concave or "bowl-shaped" member 23 sealed to the bottom portion of the tubular member 21 such that when viewed in cross-section, longitudinally, substantially a semi-circular or "bowed-shaped" bottom portion is formed when the pouch is filled with flowable material. The pouch shown in FIG. 2 is an example of so-called "Enviro-Pak" pouch known in the art.

The pouch manufactured according to the present invention is preferably the pouch shown in FIG. 1 made on so-called vertical form, fill and seal (VFFS) machines well known in the art. Examples of commercially available VFFS machines include those manufactured by Hayssen, Thimonnier, Tetra Pak, or Prepac. A VFFS machine is described in the following reference: F. C. Lewis, "Form-Fill-Seal," Packaging Encyclopedia, page 180, 1980, the disclosure of which is incorporated herein by reference.

In a VFFS packaging process, a sheet of the plastic film structure described herein is fed into a VFFS machine where the sheet is formed into a continuous tube in a tube-forming section. The tubular member is formed by sealing the longitudinal edges of the film together—either by lapping the plastic film and sealing the film using an inside/outside seal or by fin sealing the plastic film using an inside/inside seal. Next, a sealing bar seals the tube transversely at one end being the bottom of the "pouch", and then the fill material, for example milk, is added to the "pouch." The sealing bar then seals the top end of the pouch and either burns through the plastic film or cuts the film, thus, separating the formed completed pouch from the tube. The process of making a pouch with a VFFS machine is generally described in U.S. Pat. Nos. 4,503,102 and 4,521,437, which are incorporated herein by reference.

The capacity of the pouches of the present invention may vary. Generally, the pouches may contain from about 5 milliliters to about 10 liters, preferably from about 1 liter to about 8 liters, and more preferably from about 1 milliliter to about 5 liters of flowable material.

The film structure for the pouch of the present invention has precisely controlled strength. The use of the film structure described in the present invention for making a pouch results in a stronger pouch, and, therefore, more preferably, the pouch contains fewer use-related leakers. The use of an ultra low density polyethylene (ULDPE) and LDPE blend in the seal layer of the present invention in a two or three-layer coextruded film product will provide a film structure that can be used for making pouches at a faster rate in the VFFS and such pouches produced will contain fewer leakers.

With the trend in today's consumer packaging industry moving toward providing the consumer with more environmentally friendly packages, the polyethylene pouch of the present invention is a good alternative. The use of the polyethylene pouch for packaging consumer liquids such as milk has its advantages over containers used in the past: the glass bottle, paper carton, and high density polyethylene jug. The previously used containers consumed large amounts of natural resources in their manufacture, required a significant amount of space in landfill, used a large amount of storage space and used more energy in temperature control of the product (due to the heat transfer properties of the container).

The polyethylene pouch of the present invention made of thin polyethylene film, used for packaging flowable materials, offers many advantages over the containers used in the past. The polyethylene pouch (1) consumes less natural resources, (2) requires less space in a landfill, (3) can be recycled, (4) can be processed easily, (5) requires less storage space, (6) uses less energy for storage (heat transfer properties of package, (7) can be safely incinerated and (8) can be reused, for example, the empty pouch can be used for other applications such as freezer bags, sandwich bags, and general purpose storage bags.

The polymeric resins described in Table I herein below were used to prepare samples of blown films shown in the Examples and Comparative Examples.

TABLE I

| | Resin Properties | | | |
|---|---|---|---|---|
| Resin Name | Type | Melt Index dg/min. | Density, g/cc | Melt Strength, cN |
| DOWLEX 2045 | LLDPE | 1.0 | 0.920 | 6.4 |
| LDPE 135I | LDPE (tube) | 0.22 | 0.923 | 19.5 |
| XU 60021.62 | LDPE (autoclave) | 0.5 | 0.919 | 24.3 |

TABLE I-continued

| | Resin Properties | | | |
|---|---|---|---|---|
| Resin Name | Type | Melt Index dg/min. | Density, g/cc | Melt Strength, cN |
| LDPE 609C | LDPE (tube) | 0.88 | 0.924 | 12.1 |
| LDPE 526 I | LDPE (tube) | 1.0 | 0.922 | 12.1 |
| LDPE 503I | LDPE (tube) | 1.9 | 0.923 | 5 |
| ATTANE 4203 | ULDPE | 0.8 | 0.905 | 8 |

Erucamide, a slip agent; $SiO_2$, an antiblock agent; and a processing aid were added to each of the resins described in Table I such that the final concentrations of the additives were as follows: 1200 ppm erucamide; 2500 ppm $SiO_2$.

The composition of various high pressure low density polyethylene and ultra low density polyethylene blends and their melt strength is shown in Table II below.

TABLE II

| Melt Strength of Resin Blends | | |
|---|---|---|
| Blend Designation | Description (*) | Melt Strength (cN) |
| 1 | DOWLEX 2045 | 6.4 |
| 4 | LDPE 526I | 12.1 |
| 5 | LDPE 135I | 19.5 |
| 6 | LDPE 609C | 12.1 |
| 7 | LDPE XU60021.62 | 24.3 |
| 8 | DOWLEX 2045/10% 135I | 10.4 |
| 9 | DOWLEX 2045/20% 135I | 16.0 |
| 10 | DOWLEX 2045/30% 135I | 19.7 |
| 11 | DOWLEX 2045/10% 609C | 9.5 |
| 12 | DOWLEX 2045/20% 609C | 11.7 |
| 13 | DOWLEX 2045/30% 609C | 13.4 |
| 14 | DOWLEX 2045/10% XU60021.62 | 11.5 |
| 15 | DOWLEX 2045/20% XU60021.62 | 24.2 |
| 16 | DOWLEX 2045/30% XU60021.62 | 30.4 |
| 17 | ATTANE 4203/10% 135I | 12.0 |
| 18 | ATTANE 4203/20% 135I | 15.8 |
| 19 | ATTANE 4203/30% 135I | 17.5 |
| 20 | ATTANE 4203/10% 526I | 9.5 |
| 21 | ATTANE 4203/20% 526I | 10.5 |
| 22 | ATTANE 4203/30% 526I | 11.5 |
| 23 | ATTANE 4203/10% XU60021.62 | 16.1 |
| 24 | ATTANE 4203/20% XU60021.62 | 22.8 |
| 25 | ATTANE 4203/30% XU60021.62 | 33.5 |

(*) % refers to percent by weight of LDPE in the blend

A 5 kg sample of each blend shown in Table II was processed through a Leistritz twin screw extruder. The melt strength of the blends were determined using a Gottfert Rheotoens unit.

TABLE III

| Resin Blends for Multilayer (A/B/A) Films for Physical Property Testing | | | |
|---|---|---|---|
| Example No. | Resin Blend in Layer A | Resin Blend in Layer B | Overall Gauge (Mils) |
| 1 | ATTANE 4203 + 20% LDPE 135I | DOWLEX 2045 + 80% LDPE 135I | 2.43 |
| 2 | ATTANE 4203 + 20% LDPE 503I | DOWLEX 2045 + 20% LDPE 503I | 2.50 |
| 3 | ATTANE 4203 + 20% LDPE 526I | DOWLEX 2045 + 20% LDPE 526I | 2.51 |
| 4 | ATTANE 4203 + 20% XU60021.62 | DOWLEX 2045 + 20% XU60021.62 | 2.45 |

TABLE III-continued

Resin Blends for Multilayer (A/B/A) Films for Physical Property Testing

| Example No. | Resin Blend in Layer A | Resin Blend in Layer B | Overall Gauge (Mils) |
|---|---|---|---|
| Comp. A | 100% ATTANE 4203 | 100% DOWLEX 2045 | 2.53 |
| Comp. B | 100% DOWLEX 2045 | Not Applicable | 2.5 |

(*) % refers to percent by weight of LDPE in the blend

EXAMPLES 1–8 AND COMPARATIVE EXAMPLE A AND B

Blown films were made with the resin blends described in Table III using an Egan 3-layer co-extrusion line, except for Comparative B which was made using a Macro monolayer blown film line. The Egan line was operated at standard extruder conditions with a blow up ratio of 2.0 and melt temperature of 430° F. The 3 layers of the coextruded film consisted of two identical skin layers (A) and a core layer (B) in a A/B/A configuration, having the layer ratio of A:B:A equal to 1:3:1. Comparative B, made with the Macro blown film line, was operated at standard extruder conditions with a blow-up ratio of 2.0 and a melt temperature of 420° F. All films were formulated to contain the same level of slip, antiblock and processing aid. In films containing LDPE, each of the three layers contained 20% by weight of LDPE as indicated in Table III.

Film structures produced were subjected to physical testing to determine the various properties thereof including:

(1) Puncture, using method ASTM D3763;
(2) Dart Impact, using ASTM D1709, Method A;
(3) Elmendorf Tear, using ASTM D1922;
(4) Tensiles, using ASTM D882;
(5) 1% and 2% Secant Modulus, using ASTM D882;
(6) Hot Tack Strength, using method described hereinbelow; and
(7) Heat Seal Strength, using method described hereinbelow;

The hot tack strength of sample films was measured using the "DTC Hot Tack Test Method," which measures the force required to separate a heat seal before the seal has had a chance to fully cool (crystallize). This simulates the filling of material into a pouch before the seal has had a chance to cool.

The "DTC Hot Tack Test Method" is a test method using a DTC Hot Tack Tester Model #52D according to the following conditions:

Specimen Width: 25.4 mm

Sealing Time: 0.5 seconds

Sealing Pressure: 0.27 N/mm/mm

Delay Time: 0.5 seconds

Peel Speed: 150 mm/seconds

Number of Samples/Temperature: 5

Temperature Increments: 5° C.

Temperature Range: 75° C.–150° C.

The heat seal strength of sample films was measured using the "DTC Heat Seal Strength Test Method," which is designed to measure the force required to separate a seal after the material has cooled to 23° C. temperature. The film samples were exposed to a relative humidity of 50 percent and a temperature of 23° C. for a minimum of 24 hours prior to testing.

The "DTC Heat Seal Strength Test Method" uses a DTC Hot Tack Tester Model #52D, wherein the heat seal portion of the tester is used, according to the following conditions:

Specimen Width: 25.4 mm

Sealing Time: 0.5 seconds

Sealing Pressure: 0.27 N/mm/mm

Number of Samples/Temperature: 5

Temperature Increments: 5° C.

Temperature Range: 80° C.–150° C.

The seal strength of the film samples was determined using an Instron Tensile Tester Model #1122 according to the following test conditions:

Direction of Pull: 90° to seal

Crosshead Speed: 500 mm/minute

Full Scale Load: 5 kg

Number of Samples/Threshold: 1 percent of FSL

Break Criterion: 80 percent

Gauge Length: 2.0 inches
(50.8 millimeters)

Sample Width: 1.0 inch
(25.4 millimeters)

Physical properties of three-layer (A/B/A) films made from the resin blends shown in Table III are reported in Table IV below, and the results of hottack and heat seal strength are reported in Table V and VI, respectively.

TABLE IV

Physical Properties of Three-layer (A/B/A) Co-extruded Films

| Description | | | ATTANE 4203 + 20% XU 60021.62 | ATTANE 4203 + 20% 1351 | ATTANE 4203 + 20% 5031 | ATTANE 4203 + 20% 5261 | ATTANE 4203 | DOWLEX 2045 |
|---|---|---|---|---|---|---|---|---|
| Gauge | mil | | 2.45 | 2.43 | 2.50 | 2.51 | 2.53 | 2.50 |
| Elmendorf Tear | g | MD | 453 | 648 | 786 | 674 | 1,160 | 997 |
| | | CD | 1,504 | 1,734 | 1,677 | 1,785 | 1,587 | 1,424 |
| Dart Impact | g | | 352 | 371 | 323 | 335 | 535 | 288 |
| Puncture | | | | | | | | |
| Resistance | lbf | | 44.6 | 42.9 | 41.1 | 47.6 | 51.2 | 21.5 |
| Energy to Break Tensile | ft-lb/in3 | | 115.0 | 109.5 | 110.5 | 124.8 | 130.0 | 59.0 |

TABLE IV-continued

Physical Properties of Three-layer (A/B/A) Co-extruded Films

| Description | | | ATTANE 4203 + 20% XU 60021.62 | ATTANE 4203 + 20% 1351 | ATTANE 4203 + 20% 5031 | ATTANE 4203 + 20% 5261 | ATTANE 4203 | DOWLEX 2045 |
|---|---|---|---|---|---|---|---|---|
| Failure Load | lbf | MD | 12.3 | 13.0 | 12.3 | 13.0 | 15.3 | 10.8 |
| | | CD | 9.7 | 11.4 | 11.1 | 11.2 | 13.5 | 9.8 |
| Tensile Ultimate | psi | MD | 5,216 | 5,223 | 4,819 | 5,127 | 6,279 | 4,582 |
| | | CD | 4,011 | 4,684 | 4,482 | 4,463 | 5,400 | 4,200 |
| Elongation | % | MD | 680 | 671 | 683 | 757 | 725 | 617 |
| | | CD | 856 | 768 | 775 | 858 | 771 | 682 |
| Toughness | ft.lb/in3 | MD | 1,514 | 1,434 | 1,340 | 1,572 | 1,494 | 1,155 |
| | | CD | 1,168 | 1,348 | 1,342 | 1,451 | 1,445 | 1,199 |
| Tensile Yield | psi | MD | 1,480 | 1,403 | 1,369 | 1,327 | 1,412 | 1,577 |
| | | CD | 1,230 | 1,455 | 1,461 | 1,456 | 1,482 | 1,897 |
| 1% Secant | psi | MD | 34,054 | 29,200 | 29,055 | 26,554 | 27,956 | 35,946 |
| | | CD | 36,001 | 34,879 | 32,898 | 31,420 | 33,825 | 44,946 |
| 2% Secant | psi | MD | 28,839 | 24,400 | 23,919 | 22,553 | 23,338 | 29,826 |
| | | CD | 29,747 | 27,724 | 27,267 | 26,254 | 27,944 | 35,425 |

TABLE V

Hottack Strength (N/in) of Three-layer (A/B/A) Films

| TEMP., (°C.) | ATTANE 4203 + 20% XU 60021.62 60021.62 | ATTANE 4203 + 20% 1351 LDPE 1351 | ATTANE 4203 + 20% 5031 LDPE 5031 | ATTANE 4203 + 20% 5261 LDPE 5261 | ATTANE 4203 | DOWLEX 2045 |
|---|---|---|---|---|---|---|
| 75 | 0.18 | 0.15 | 0.17 | 0.19 | 0.18 | |
| 80 | 0.22 | 0.22 | 0.21 | 0.30 | 1.08 | |
| 85 | 0.81 | 1.51 | 1.49 | 1.25 | 2.18 | |
| 90 | 1.50 | 2.12 | 1.85 | 1.68 | 2.16 | 0.23 |
| 95 | 2.79 | 2.83 | 2.11 | 2.08 | 2.55 | 0.17 |
| 100 | 3.65 | 3.45 | 2.37 | 2.85 | 2.67 | 0.64 |
| 105 | 3.49 | 3.36 | 2.60 | 2.68 | 2.51 | 1.91 |
| 110 | 3.37 | 3.31 | 2.66 | 2.52 | 2.31 | 2.47 |
| 115 | 3.43 | 3.21 | 2.59 | 2.35 | 2.69 | 3.28 |
| 120 | 2.86 | 2.76 | 2.12 | 1.93 | 2.37 | 2.64 |
| 125 | 2.49 | 2.25 | 1.92 | 1.74 | 2.23 | 2.51 |
| 130 | 2.02 | 1.98 | 1.88 | 1.67 | 2.05 | 2.38 |
| 135 | 1.84 | 1.86 | 1.87 | 1.62 | 1.89 | 2.35 |
| 140 | 1.70 | 1.79 | 1.68 | 1.54 | 1.70 | 2.27 |
| 145 | 1.67 | 1.76 | 1.70 | 1.48 | 1.75 | 2.17 |
| 150 | 1.53 | 1.60 | 1.54 | 1.29 | 1.51 | 1.96 |

TABLE VI

Heat Seal Strength (lb/in) of Three-layer (A/B/A) Films

| °C. | AFF 1880 + 20% 1351 (80% LD in core) | AFF 1880 + 20% 1351 | AFF 1880 + 20% XU 60021.62 | AFF 1880 + 20% 5031 | AFF 1880 + 20% 5261 | AFFIN-ITY 1880 | ATTANE 4203 | EX 3033 + 20% XU 60021.62 | EX 3033 + 20% 1351 | EX 3033 + 20% 5261 | EX 3033 |
|---|---|---|---|---|---|---|---|---|---|---|---|
| 80 | 0.31 | 0.19 | 0.31 | 0.20 | 0.22 | 0.29 | 0.38 | | | | |
| 85 | 2.60 | 2.68 | 1.72 | 0.97 | 0.86 | 2.76 | 0.39 | 0.36 | 0.08 | 0.05 | 0.20 |
| 90 | 3.52 | 3.79 | 3.45 | 3.79 | 2.93 | 3.59 | 1.40 | 1.40 | 1.74 | 1.78 | 3.02 |
| 95 | 4.36 | 4.43 | 4.01 | 4.32 | 3.50 | 3.87 | 3.38 | 3.88 | 4.27 | 3.68 | 3.92 |
| 100 | 6.43 | 5.31 | 4.84 | 4.60 | 4.04 | 4.39 | 3.75 | 4.98 | 5.20 | 4.43 | 4.62 |
| 105 | 7.15 | 5.51 | 5.63 | 4.62 | 4.60 | 4.57 | 3.85 | 5.83 | 5.55 | 5.23 | 4.92 |
| 110 | 7.69 | 5.69 | 5.62 | 4.71 | 4.66 | 4.68 | 4.19 | 5.82 | 6.05 | 5.32 | 4.95 |
| 115 | 7.30 | 5.67 | 5.56 | 4.90 | 4.58 | 4.72 | 4.51 | 5.80 | 6.16 | 5.33 | 5.04 |
| 120 | | 5.56 | 5.74 | 5.16 | 4.92 | 4.88 | 5.33 | 5.95 | 6.16 | 5.59 | 4.96 |
| 125 | 7.60 | 5.31 | 5.97 | 5.23 | 5.10 | 4.99 | 5.27 | 6.01 | 6.28 | 5.33 | 4.98 |
| 130 | 8.23 | 5.89 | 5.92 | 5.04 | 5.05 | 5.05 | 5.24 | 6.38 | 6.37 | 4.99 | 4.95 |
| 135 | 8.34 | 5.48 | 5.93 | 5.19 | 5.24 | 5.20 | 5.35 | 6.15 | 6.28 | 5.58 | 5.00 |
| 140 | 8.77 | 5.46 | 5.91 | 4.94 | 5.36 | 5.57 | 5.42 | 5.95 | 6.39 | 5.43 | 5.30 |
| 145 | 8.52 | 5.43 | 5.87 | 4.95 | 5.50 | 5.60 | 5.67 | 6.04 | 6.51 | 5.56 | 4.98 |
| 150 | 8.86 | 5.52 | 5.70 | 4.93 | 5.20 | 5.40 | 5.73 | 6.53 | 6.58 | 5.70 | 5.13 |

The present invention is illustrated by the following examples but is not to be limited thereby.

EXAMPLES 9–11 AND COMPARATIVE EXAMPLE C AND D

The films made from resin blends described in Table III were slit to a width of 15 inches (38.1 cm) to produce 2-liter milk pouches using a Prepac IS6 Vertical, Form, Fill and Seal machine located at a commercial dairy. The unit packaged 2-liter milk filled pouches at the rate of 30 pouches per minute per filling head under normal operating conditions. For each film tested, approximately 16–20 milk-filled pouches were collected. They were inspected for initial seal integrity. Ten (10) pouches were drained, washed and dried for further evaluation.

The initial examination of end seal integrity involved three steps:

i) Determination Of On-Line Leakers ii) Subjective Seal Strength Test iii) Visual Examination of End Seals

On Line Leakers

On line leakers were seen with the pouches made from 100% ATTANE 4203 and DOWLEX 2045. No leakers were seen with the other films.

Subjective Seal Strength Test

The subjective seal strength test involved squeezing the pouch from one end until the pouch either yielded or the seal failed. Table VII shows that no seal failures were seen with the pouches made with films containing 20% by weight of 135I or XU 60021.62.

Visual Examination of End Seals

The pouches made from multilayer film containing ATTANE 4203 and DOWLEX 2045 in the seal layer had significant seal thinning and end seal stringers as shown in Table VIII. The pouches made with 20% LDPE 526I had some seal thinning and some end seal stringers film polymer filaments coming from the seal area. No seal thinning or stringers were found with the 20% pouches containing 20% LDPE 135I or LDPE XU 60021.62 in the seal layer of the film.

End-Seal Strength 2-liter milk pouches were tested for end seal strength using an Instron Tensile Tester Model #1122, under same conditions described in connection with the determination of heat seal strength hereinabove.

The seal strengths are shown in Table IX. Seal strength was found to increase as the melt strength of the polymer blend in the seal layer increased. No correlation was evident between LDPE melt index and seal strength.

Microscopy Examination of End Seals

The stringer regions and edge regions of the pouches were cryo-sectioned and examined using light microscopy techniques. Table X summarizes the results.

The pouches made from films containing 20% 135I and XU 60021.62 in the seal layer showed very little seal thinning and no end seal stringers (fine polymer filaments coming from the seal area), while the pouches containing 100% ATTANE 4203 and DOWLEX 2045 had significant seal thinning and stringers.

Seal Region Film Thinning

The weakest part of a good seal is typically the film just in front of the seal bead. Any thinning of this film results in lower seal strengths since this is the region that fails when the seal is stressed. Comparing the melt strength of the resin blends (Table II) with the amount of film thinning seen with the pouches made with a commercial VFFS unit (Table X), it is seen that, as the melt strength of the resin blend increased, the amount of film thinning decreased. No correlation was seen between film thinning (Table X) and melt index of LDPE in resin blends (Table I).

TABLE VII

Commercial Dairy Prepac VFFS Evaluation Subjective Seal Strengths

| Run # | LLDPE | LDPE | % LDPE | # Pouches Tested | # Seal Failure |
|---|---|---|---|---|---|
| Comparative C | ATTANE 4203 | | 0 | 8 | 3 |
| Comparative D | DOWLEX 2045 | | 0 | 7 | 3 |
| 9 | ATTANE 4203 | 526I | 20 | 9 | 2 |
| 10 | ATTANE 4203 | 135I | 20 | 7 | 0 |
| 11 | ATTANE 4203 | XU.62 | 20 | 8 | 0 |

Table VIII

Commercial Dairy Prepac VFFS Evaluation Visual Examination of End Seals

| Run # | LLDPE | LDPE | % LDPE | Visual Examination of Seal |
|---|---|---|---|---|
| Comparative C | ATTANE 4203 | — | 0 | heavy stringers, seal thinning |
| Comparative D | DOWLEX 2045 | — | 0 | heavy stringers, seal thinning |
| 9 | ATTANE 4203 | 526I | 20 | some stringers, seal thinning |
| 10 | ATTANE 4203 | 135I | 20 | no stringers |
| 11 | ATTANE 4203 | XU.62 | 20 | no stringers |

TABLE

Prepac VFFS Pouch End Seal Strength

| Run # | LLDPE MI | LDPE MI | % LDPE | Seal Strength, lb/in |
|---|---|---|---|---|
| Comparative C | ATTANE 4203 | — | 0 | 5.46 |
| Comparative D | DOWLEX 2045 | — | 0 | 5.31 |
| 9 | ATTANE 4203 | 526I | 20 | 5.55 |
| 10 | ATTANE 4203 | 135I | 20 | 5.75 |
| 11 | ATTANE 4203 | XU.62 | 20 | 6.49 |

TABLE X

Prepac VFFS Microscopy Analysis Summary

| # | Description | Comments | *Film Thickness μm | **Film Thickness Before Seal, μm | Reduction in Film Thickness, % |
|---|---|---|---|---|---|
| Comparative C | ATTANE 4203 | severe thinning and drawing of seal area many seal stringers | 69.3 | 48.8 | 30 |
| Comparative D | DOWLEX 2045 | severe thinning and drawing of seal area many seal stringers | 65.5 | 43.1 | 34 |
| 9 | ATTANE 4203 + 20% LDPE 526I | severe thinning, many stringers | 69.4 | 49.8 | 28 |
| 10 | ATTANE 4203 + 20% LDPE 135I | good, no thinning, no stringers | 76.8 | 70.3 | 8 |
| 11 | ATTANE 4203 + 20% XU 60021.62 | good, no thinning, no stringers | 71.5 | 69.8 | 2 |

*measured 550 μm from seal
**measured cross section at thinnest part of film before the seal Table XI shows Hottack data for LDPE 135I and ATTANE 4203 as well as predicted and observed hottack values for the blends of 80% by weight of ATTANE 4203 and 20% by weight of LDPE 135I. It can be seen that the observed hottack strength of the ATTANE 4203 and LDPE 135I blends of the present invention is significantly higher than the predicted level for the blend indicating a clearly synergistic effect.

TABLE XI

Hottack Strength-ATTANE Predicted vs. Observed Values

| Temp, °C. | ATTANE 4203 | LDPE 135I | ATTANE 4203 + 20% 135I Predicted | ATTANE 4203 + 20% 135I Observed |
|---|---|---|---|---|
| 90 | 2.16 | 0.00 | 1.75 | 2.12 |
| 95 | 2.55 | 0.18 | 2.09 | 2.83 |
| 100 | 2.67 | 0.22 | 2.20 | 3.45 |
| 105 | 2.51 | 0.56 | 2.14 | 3.36 |
| 110 | 2.31 | 0.81 | 2.02 | 3.31 |
| 115 | 2.69 | 0.86 | 2.35 | 3.21 |
| 120 | 2.37 | 0.74 | 2.06 | 2.76 |
| 125 | 2.23 | 0.69 | 1.94 | 2.25 |
| 130 | 2.05 | 0.69 | 1.79 | 1.98 |
| 135 | 1.89 | 0.64 | 1.65 | 1.86 |
| 140 | 1.70 | 0.64 | 1.50 | 1.79 |
| 145 | 1.75 | 0.60 | 1.53 | 1.76 |
| 150 | 1.51 | 0.56 | 1.33 | 1.60 |

Predicted hottack strength was calculated as per the following:

Predicted hottack=(0.8×ATTANE 4203 hottack)+(0.2×LDPE hottack)

What is claimed is:

1. A pouch containing a flowable material, said pouch being made from a film structure with at least one seal layer of a polymeric composition comprising:
(A) from 10 to 100 percent, based on the total weight of said composition, of a mixture of (1) from 5 to 95 percent by weight, based on 100 weight parts of said mixture, of at least one ultra low density polyethylene being a linear ethylene copolymer interpolymerized from ethylene and at least one alpha-olefin in the range of $C_3$–$C_{18}$ and having (a) a density from 0.89 g/c.c. to less than 0.916 g/c.c., (b) a melt index ($I_2$) of less than 10 g/10 minutes, (c) a melt flow ratio, $I_{10}/I_2$, greater than 0.1 (d) a molecular weight distribution, Mw/Mn ratio, of greater than 3 (e) a peak melting point greater than 100° C. as measured by a differential scanning calorimeter; and (2) from 5 to 95 percent by weight, based on 100 weight parts of said mixture, of at least one high pressure low density-polyethylene having (a) a density from 0.916 g/cc to 0.93 g/cc, (b) a melt index ($I_2$) of less than 1 g/10 minutes and (c) a melt strength greater than 10 cN as determined using a Gottfert Rheotens unit at 190° C.; and (B) from 0 to 90 percent, based on the total weight of said composition, at least one polymer selected from the group consisting of a linear low density polyethylene, a high pressure low density polyethylene, and an ethylene-vinyl acetate copolymer.

2. A pouch containing a flowable material, said pouch being made from a multilayer film structure comprising:
(I) a layer of polymeric composition comprising:
(A) from 10 to 100 percent, based on the total weight of said composition, of a mixture of (1) from 5 to 95 percent by weight, based on 100 weight parts of said mixture, of at least one ultra low density polyethylene being a linear ethylene copolymer interpolymerized from ethylene and at least one alpha-olefin in the range of $C_3$–$C_{18}$ and having (a) a density from 0.89 g/cc to less than 0.916 g/cc, (b) a melt index ($I_2$) of less than 10 g/10 minutes, (c) a melt flow ratio, $I_{10}/I_2$ greater than 5 (d) a molecular weight distribution, Mw/Mn ratio, of greater than 3 (e) a peak melting point greater than 100° C. as measured by a differential scanning colorimeter; and (2) from 5 to 95 percent by weight, based on 100 weight parts of said mixture, of at least one high pressure low density polyethylene having a density from 0.916 to 0.93 g/cc, a melt index ($I_2$) of less than 1 g/10 minutes and melt strength greater than 10 cN as determined using a Gottfert Rheotens unit at 190° C.; and (B) from 0 to 90 percent, based on the total weight of said composition, at least one polymer selected from the group consisting of a linear low density polyethylene, a high pressure low density polyethylene, and an ethylene-vinyl acetate copolymer;

(II) at least one layer of linear ethylene copolymer interpolymerized from ethylene and at least one alpha-olefin in the range of $C_3$–$C_{18}$ and having a density from 0.916 to 0.940 g/cc and a melt index of from 0.1 to 10 g/10 minutes.

3. The pouch of claim 1 wherein said film structure is in a tubular form and said pouch has transversely heat sealed ends.

4. The pouch of claim 2 having (III) a layer of a high-pressure polyethylene having a density of from 0.916 to 0.930 g/cc and a melt index of from 0.1 to 10 g/10 minutes.

5. The pouch of claim 2 wherein layer (I) is a seal layer.

6. The pouch of claim 2 wherein layer (II) is an outer layer and layer (I) is a seal layer.

7. The pouch of claim 4 wherein layer (II) is an outer layer, layer (III) is a core layer and layer (I) is a seal layer.

8. The pouch of claim 1 wherein the pouch holds from about 5 mL to about 10,000 mL.

9. The pouch of claim 1 wherein the flowable material is milk.

10. The pouch of claim 1 wherein the ultra low density polyethylene has an $I_{10}/I_2$ from 0.1 to 20.

11. The pouch of claim 1 wherein the film structure contains a slip agent, antiblock agent and, optionally, a processing aid.

12. The pouch of claim 1 wherein the film structure contains a pigment to render the film structure opaque.

13. The pouch of claim 1 wherein the film structure contains an ultraviolet light absorbing additive.

14. The pouch of claim 1 wherein the alpha-olefin of the film structure is 1-butene.

15. The pouch of claim 1 wherein the alpha-olefin of the film structure is 1-hexene.

16. The pouch of claim 1 wherein the alpha-olefin of the film structure is 1-octene.

17. The pouch of claim 1 wherein the alpha-olefin of the film structure is a mixture of at least two α-olefins selected from the group consisting of 1-butene, 1-hexene, and 1-octene.

18. The pouch of claim 1 wherein the melt strength of the high pressure low density polyethylene is in the range of from 10 to 40 cN.

19. The pouch of claim 1 wherein the melt strength of the high pressure low density polyethylene is in the range of from 13 to 25 cN.

20. The pouch of claim 1 wherein the melt strength of the polymeric composition is in the range of from 5 to 70 cN.

21. A film structure of a polymeric composition for a packaging application comprising:

(A) from 10 to 100 percent, based on the total weight of said composition, of a mixture of (1) from 5 to 95 percent by weight, based on 100 weight parts of said mixture, of at least one ultra low density polyethylene being a linear ethylene copolymer interpolymerized from ethylene and at least one alpha-olefin in the range of $C_3$–$C_{18}$ and having (a) a density from 0.89 g/cc to less than 0.916 g/cc, (b) a melt index ($I_2$) of less than 10 g/10 minutes, (c) a melt flow ratio, $I_{10}/I_2$ greater than 5 (d) a molecular weight distribution, Mw/Mn ratio, of greater than about 3 (e) a peak melting point greater than 100° C. as measured by a differential scanning calorimeter; and (2) from 5 to 95 percent by weight, based on 100 weight parts of said mixture, of high pressure low density polyethylene having a density from 0.916 to 0.93 g/cc, a melt index of less than about 1 g/10 minutes and melt strength greater than 10 cN as determined using a Gottfert Rheotens unit at 190° C.; and (B) from 0 to 90 percent, based on the total weight of said composition, at least one polymer selected from the group consisting of a linear low density polyethylene, a high pressure low density polyethylene, and an ethylene-vinyl acetate copolymer.

22. The film of claim 21 wherein the density of the linear ethylene copolymer is from 0.916 to 0.94 g/cm$^3$.

23. The film of claim 21 wherein the concentration of ethylene vinyl acetate copolymer is 5 to 85 percent based on the total weight of said composition.

24. The film of claim 21 wherein the concentration of ethylene vinyl acetate copolymer is 5 to 25 percent based on the total weight of said composition.

25. The film of claim 21 wherein the melt strength of the polymeric composition is in the range from 5 to 70 cN.

26. A process for preparing a pouch containing a flowable material comprising forming a film structure by either blown tube extrusion or cast extrusion, forming the film structure into a tubular member and transversely heat-sealing opposite ends of the tubular member, said tubular member comprising a film structure for a pouch container with at least one seal layer of a polymeric composition comprising:

(A) from 10 to 100 percent, based on the total weight of said composition, of a mixture of (1) from 5 to 95 percent by weight, based on 100 weight parts of said mixture, of at least one ultra low density polyethylene being linear ethylene copolymer interpolymerized from ethylene and at least one alpha-olefin in the range of $C_3$–$C_{18}$ and having (a) a density from 0.89 g/cc to less than about 0.916 g/cc, (b) a melt index ($I_2$) of less than 10 g/10 minutes, (c) a melt flow ratio, $I_{10}/I_2$ greater than 5 (d) a molecular weight distribution, Mw/Mn ratio, of greater than 3 (e) a peak melting point greater than 100° C. as measured by a differential scanning calorimeter and (2) from 5 to 95 percent by weight, based on 100 weight parts of said mixture, of high pressure low density polyethylene having a density from 0.916 to 0.93 g/cc, a melt index ($I_2$) of less than 1 g/10 minutes and melt strength greater than 10 cN as determined using a Gottfert Rheotens unit at 190° C.; and (B) from 0 to 90 percent, based on the total weight of said composition, at least one polymer selected from the group consisting of a linear low density polyethylene, a high pressure low density polyethylene, and an ethylene-vinyl acetate copolymer.

27. A process for preparing a pouch containing a flowable material comprising forming a film structure by either blown tube extrusion or cast extrusion, forming the film structure into a tubular member and transversely heat-sealing opposite ends of the tubular member, said tubular member comprising:

(I) a layer of polymeric composition comprising:
(A) from 10 to 100 percent, based on the total weight of said composition, of a mixture of (1) from 5 to 95 percent by weight, based on 100 weight parts of said mixture, of at least one ultra low density polyethylene being linear ethylene copolymer interpolymerized from ethylene and at least one alpha-olefin in the range of $C_3$–$C_{18}$ and having (a) a density from 0.89 g/cc to less than about 0.916 g/cc, (b) a melt index ($I_2$) of less than 10 g/10 minutes, (c) a melt flow ratio, $I_{10}/I_2$ greater than 5 (d) a molecular weight distribution, Mw/Mn ratio, of greater than 3 (e) a peak melting point greater than about 100° C. as measured by a differential scanning calorimeter and (2) from 5 to 95 percent by weight, based on 100 weight parts of said mixture, of high pressure low density polyethylene having a density from about 0.916 to 0.93 g/cc, melt index ($I_2$) of less than 1 g/10 minutes and melt strength greater than about 10 cN as determined using a Gottfert Rheotens unit at 190° C.; and (B) from 0 to 90 percent, based on the total weight of said composition, at least one polymer selected from the group consisting of a linear low density polyethylene, a high pressure low density polyethylene, and an ethylene-vinyl acetate copolymer;

(II) at least one layer of linear ethylene copolymer interpolymerized from ethylene and at least one alpha-olefin in the range of $C_3$–$C_{18}$ and having a density from 0.916 to 0.094 g/cc and a melt index ($I_2$) of from 0.1 to 10 g/10 minutes.

28. The process of claim 27 wherein the film structure includes:

(III) at least one layer of a high-pressure polyethylene having a density of from 0.916 to 0.93 g/cc and a melt index ($I_2$) of from 0.1 to 10 g/10 minutes.

* * * * *